(12) United States Patent
Kadowaki et al.

(10) Patent No.: US 7,561,378 B2
(45) Date of Patent: Jul. 14, 2009

(54) DATA ERASING DEVICE USING PERMANENT MAGNET

(75) Inventors: Yoshinori Kadowaki, Higashine (JP); Hisato Suzuki, Higashine (JP); Hiroyuki Uematsu, Higashine (JP); Hiroshi Hasegawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 11/311,684

(22) Filed: Dec. 20, 2005

(65) Prior Publication Data
US 2007/0047128 A1 Mar. 1, 2007

(30) Foreign Application Priority Data
Aug. 31, 2005 (JP) .............................. 2005-251850

(51) Int. Cl.
*G11B 5/03* (2006.01)
(52) U.S. Cl. ...................................... 360/118
(58) Field of Classification Search ........................ None
See application file for complete search history.

(56) References Cited

U.S. PATENT DOCUMENTS

| | | | |
|---|---|---|---|
| 6,570,727 B1 * | 5/2003 | Tamura et al. ................. 360/66 |
| 6,594,099 B2 | 7/2003 | Serizawa | |
| 7,027,249 B2 * | 4/2006 | Hasegawa et al. .............. 360/66 |
| 2002/0021521 A1 * | 2/2002 | Kitahori et al. ................ 360/66 |
| 2003/0053399 A1 * | 3/2003 | Yoo et al. ..................... 369/126 |
| 2004/0051989 A1 * | 3/2004 | Hasegawa et al. .............. 360/66 |
| 2005/0041319 A1 * | 2/2005 | Hasegawa et al. .............. 360/66 |
| 2005/0243461 A1 * | 11/2005 | Kitamura et al. .......... 360/99.08 |
| 2006/0146435 A1 * | 7/2006 | Hasegawa et al. .............. 360/66 |

FOREIGN PATENT DOCUMENTS

JP 2004-110908 4/2004

* cited by examiner

*Primary Examiner*—Mark Blouin
(74) *Attorney, Agent, or Firm*—Fujitsu Patent Center

(57) ABSTRACT

A data erasing device that erases data recorded on a magnetic disk, by a magnetic field generated in a horizontal direction by magnets, in order to prevent leakage of the data recorded on the magnetic disk of a magnetic disk device to be abandoned. The data erasing device includes a main body case having a path on which a tray is reciprocated, a demagnetizing circuit having plural permanent magnets adjacently disposed along the path in mutually adsorbing polarities, and a tray for accommodating the magnetic recording medium, and capable of reciprocating on the path. This tray includes a first accommodation groove and a second accommodation groove for accommodating the magnetic disk device. The first accommodation groove and the second accommodation groove cross each other to form an angle of 45 degrees or 90 degrees.

11 Claims, 12 Drawing Sheets

DATA ERASING DEVICE USING PERMANENT MAGNET

CROSS-REFERENCE TO RELATED APPLICATION

This application claims priority from, and incorporates by reference the entire disclosure of, Japanese Patent Application No. 2005-251850, filed on Aug. 31, 2005.

BACKGROUND OF THE INVENTION

1. Field of the Invention

The present invention relates to a data erasing device and, more particularly, to a data erasing device for a hard disk device used as a storage device in a computer.

2. Description of the Related Art

Conventionally, in computers such as personal computers and the like, recording media for recording programs and data are necessary and, in recent years, hard disk devices using a disk coated with a magnetic material have become popular as such recording media. Such hard disk devices are built into the computer or are used as external hard disk devices connected to the computer via a cable, data being written into at least one internal disk via at least one head. The storage capacity of these types of hard disks has been steadily increasing over the years.

Meanwhile, personal computers are being sold in new formats year by year along with advances in the operating systems that drive them, the processing speed of CPUs (central processing units), the expansion of communication functions, the increase in the capacity of hard disk devices, and the like, so that there is a tendency for old personal computers to be replaced with new personal computers within a short period of time.

Hard disk devices built into old computers that have been disposed of when replaced by new computers, and hard disk devices with small memory capacities which have been disposed of when replaced by new hard disk devices with larger memory capacities, still contain large amounts of various types of data which were written into the hard disk device while it was in use. Amongst this data is data, such as personal information, internal company information and the like, that must not be leaked to a third person. In such cases it is common to perform an erasing process using computer software to erase data from the hard disk device prior to disposal.

However, this data erasing process is simply a process which allows data to be written over regions of the disks in the hard disk device in which data has been previously stored. Consequently, all of the data which had been stored on the disk is not completely erased. Thus, regarding hard disk devices from which data has not been completely erased in this manner, a malicious third person, using special software, can read the remaining data.

In this regard, as methods for completely erasing data recorded on a hard disk device, a method of writing random data on the entire surface of the magnetic disk in the hard disk devices and a method of forcefully erasing data by passing the magnetic disks of hard disk device through a powerful magnetic field such as that generated by a permanent magnet or the like, are known. With respect to the first method, the existence of software for service organizations and retailers to perform this method is well known. Also, with respect to the second method, data erasing devices for erasing data by applying a strong magnetic field to magnetic disks by controlling the strength of the magnetic field applied to the spindle motor of the hard disk device are known (for example, refer to U.S. Pat. No. 6,594,099 (JP-A-2001-331904)). Because the data erasing device disclosed in U.S. Pat. No. 6,594,099 has an object of allowing reuse of the magnetic disks, data on the magnetic disk is deleted by passing one end of the magnetic disk device through a magnetic field sandwiched by permanent magnets in a state that the magnetic disk is rotated by the spindle motor.

The method of writing random data on the entire surface of the magnetic disks of the hard disk device as described above has a problem in that writing the data takes time due to the large capacity of the hard disk device, and has an additional problem in that the disposal cost increases when a service organization is asked to erase the data. On the other hand, in the data erasing device disclosed in U.S. Pat. No. 6,594,099 for erasing data by means of magnetic saturation, by passing the magnetic disk through a strong magnetic field, equipment for rotating the spindle motor is necessary, leading to the problem of an increase in the device size. Also, there is a problem in that if, for some reason, the spindle motor does not rotate, the data will not be completely erased. As explained above, the conventional data erasing device does not take into account the erasing of data with the object of only preventing data leakage from the disposed hard disk device without reusing the magnetic disk.

In order to prevent leakage of data recorded on a magnetic disk device or other magnetic recording medium such as a hard disk device to be destroyed, the inventors of the present invention have proposed a simple data erasing device capable of securely erasing data from a hard disk device in a simple operation, by placing the hard disk device on a tray and inserting and ejecting this disk device to and from the data erasing device, as shown in a second embodiment of US-2004-51989-A1(JP-A-2004-110908).

However, according to the data erasing device which the inventors of the present invention proposed in the second embodiment of US-2004-51989-A1, an erasing magnetic field is applied to the hard disk device from only one direction, thereby erasing the data recorded on the magnetic recording medium. Therefore, a large magnet must be used for the magnetic circuit that generates the erasing magnetic field. Consequently, the data erasing device becomes large and has increased weight. Further, a magnetic shielding mechanism that prevents leakage of magnetism to the outside becomes large. This results in high cost of the data erasing device.

A large magnet is used in the data erasing device for the following reason. When an erasing magnetic field is applied to the hard disk device from only one direction, data in a direction parallel with a direction of an external magnetic field can be demagnetized easily. However, data in a direction at a right angles to the direction of the external magnetic field cannot be easily demagnetized. Therefore, in order to completely erase the data, it has been necessary to use a magnet that generates a magnetic field having coercive force about two times that of the magnetic recording medium.

SUMMARY OF THE INVENTION

Therefore, it is an object of the present invention to provide a low-cost data erasing device by decreasing the size of a magnet used in a magnetic circuit that generates an erasing magnetic field, by arranging such that the erasing magnetic field can be applied to the hard disk device from many directions, by decreasing the size and weight of the data erasing device, and by decreasing the size of a magnetic shielding mechanism that prevents magnetism from being leaked out to the outside.

The present invention that achieves the above object is disclosed as the following first to fourth aspects.

According to a first aspect of the present invention, there is provided a data erasing device that erases data, recorded on a magnetic recording medium, by using a magnetic field generated from permanent magnets each having a north pole and a south pole, the data erasing device including: a main body case having an opening on at least one side surface, and having a path which is connected to the opening inside the main body and which reciprocates the magnetic recording medium; magnetic field generating sources provided along at least one of surfaces of the path parallel with the magnetic recording medium, and having plural permanent magnets adjacently disposed in mutually adsorbing polarities; and a tray capable of accommodating the magnetic recording medium, and capable of reciprocating within the main body case on the path, wherein a first and a second accommodation grooves for accommodating the magnetic recording medium are provided to cross each other at a predetermined angle.

According to the data erasing device of the first aspect, a center line of the first accommodation groove is parallel with the center line of the tray, and the center line of the second accommodation groove can be inclined by 45 degrees from the center line of the tray.

According to a second aspect of the present invention, there is provided a data erasing device that erases data, recorded on a magnetic recording medium, by using a magnetic field generated from permanent magnets each having a north pole and a south pole, the data erasing device including: a main body case having an opening on at least one side surface, and having a path which is connected to the opening inside the main body and which reciprocates the magnetic recording medium; magnetic field generating sources provided along at least one of surfaces of the path parallel with the magnetic recording medium, and having plural permanent magnets adjacently disposed in mutually adsorbing polarities; and a tray capable of accommodating the magnetic recording medium, and capable of reciprocating within the main body case on the path, wherein the tray is provided with a rotation plate having an accommodation for accommodating the magnetic recording medium, and is provided with a rotation mechanism of the rotation plate, and the rotation mechanism rotates the rotation plate by a predetermined angle when the tray returns from the innermost position toward the opening on the path, from the position of the tray when the tray proceeds toward the innermost position on the path.

According to a third aspect of the present invention, there is provided the data erasing device according to the second aspect, wherein the tray includes an inner tray that has a rotation plate having the accommodation groove, and an outer tray that accommodates the inner tray, the outer tray reciprocates within the path, and when the outer tray is at an initial position within the path, the inner tray is drawn out from the outer tray, and the rotation plate is positioned at the outside of the data erasing device.

According to a fourth aspect of the present invention, there is provided the data erasing device according to the third aspect, wherein the inner tray includes: an energizing mechanism that rotates the rotation plate in the counterclockwise direction; a first latch mechanism that latches the rotation of the rotation plate, and stops the rotation plate at a first position; a second latch mechanism that latches the rotation plate at a second position when the rotation plate latched by the first latch mechanism is delatched, and is rotated in the counterclockwise direction; a releasing mechanism that releases a latch state of the second latch mechanism; and a lever that enables the rotation plate to be manually rotated to return to the first position when the releasing mechanism releases a latch state.

The data erasing device according to the present invention has an effect that the cost of the data erasing device can be decreased by decreasing the size of a magnet used in a magnetic circuit that generates an erasing magnetic field to be applied to the magnetic disk device to erase data, through application of the erasing magnetic field to the magnetic disk device from many directions, by decreasing the size and weight of the data erasing device, and by decreasing the size of a magnetic shielding mechanism that prevents magnetism from being leaked out to the outside.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Embodiments of the present invention will be explained in detail based on concrete examples and with reference to the accompanying drawings. Problems of the conventional data erasing device will be explained with reference to FIGS. 2A and 2B and FIGS. 3A and 3B.

Figure 1A:
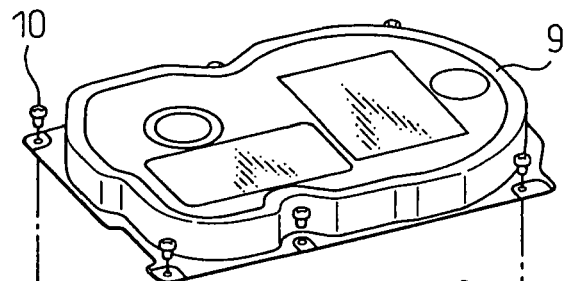
FIG. 1A is an exploded perspective view of a magnetic disk device from which data is to be erased by the data erasing device according to the present invention.

FIG. 1A is an exploded perspective view of a magnetic disk device 1 from which data is to be erased by the data erasing device according to the present invention. The magnetic disk device 1 is a hard disk device, and is sealed by an aluminum alloy base 2 and a cover 9. A spindle motor 3 is attached to the top of the base 2 by screws 4. At least one magnetic disk 5 is fixed to the spindle motor 3 via a clamp 7 by means of screws 8. The magnetic disks 5 are a disk-shaped recording medium for recording data, and the number of magnetic disks 5 fixed to the spindle motor 1 is determined by the specifications of the magnetic disk device 1. Spacers 6 are inserted between each of the magnetic disks 5 and between the magnetic disks 5 and the clamp 7.

Figure 1B:
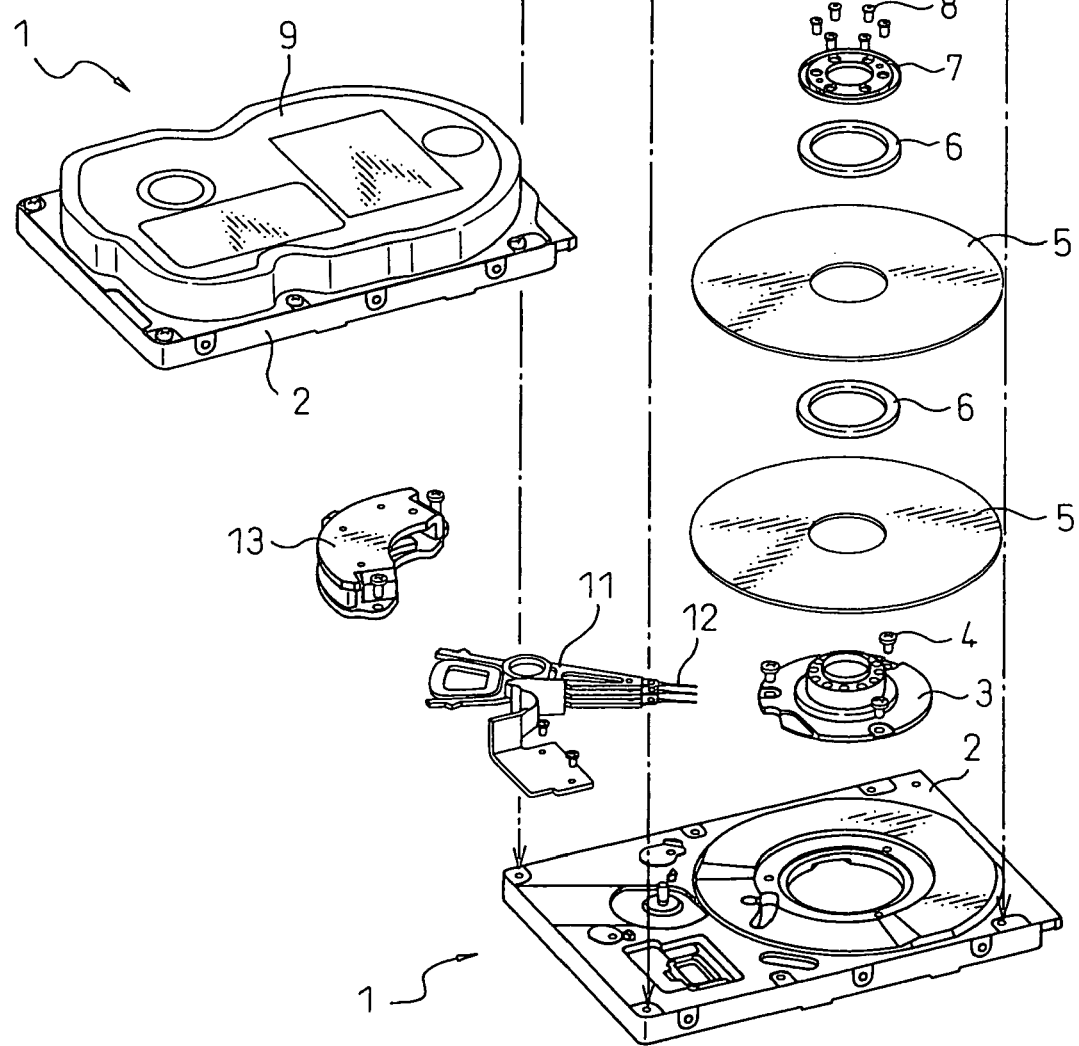
FIG. 1B is a perspective view of the magnetic disk device shown in FIG. 1A in a state that the magnetic disk device is assembled.

Also, among the components in proximity with the magnetic disk 5 above the base 2, an actuator 11 is slidably attached. At the tip of the actuator 11, a head portion 12 comprising heads for writing data into the magnetic disks 5 or reading data from the magnetic disks 5 is provided. Also, the end portion of the actuator 11 at the opposite side of the head portion 12 is driven by a voice coil motor (VCM) 13 similarly fixed to the base 2. After the components described above are attached to the top of the base 2, the cover 9 is fixed to the base 2 with screws 10, thereby obtaining a state shown in FIG. 1B.

Figure 2A:
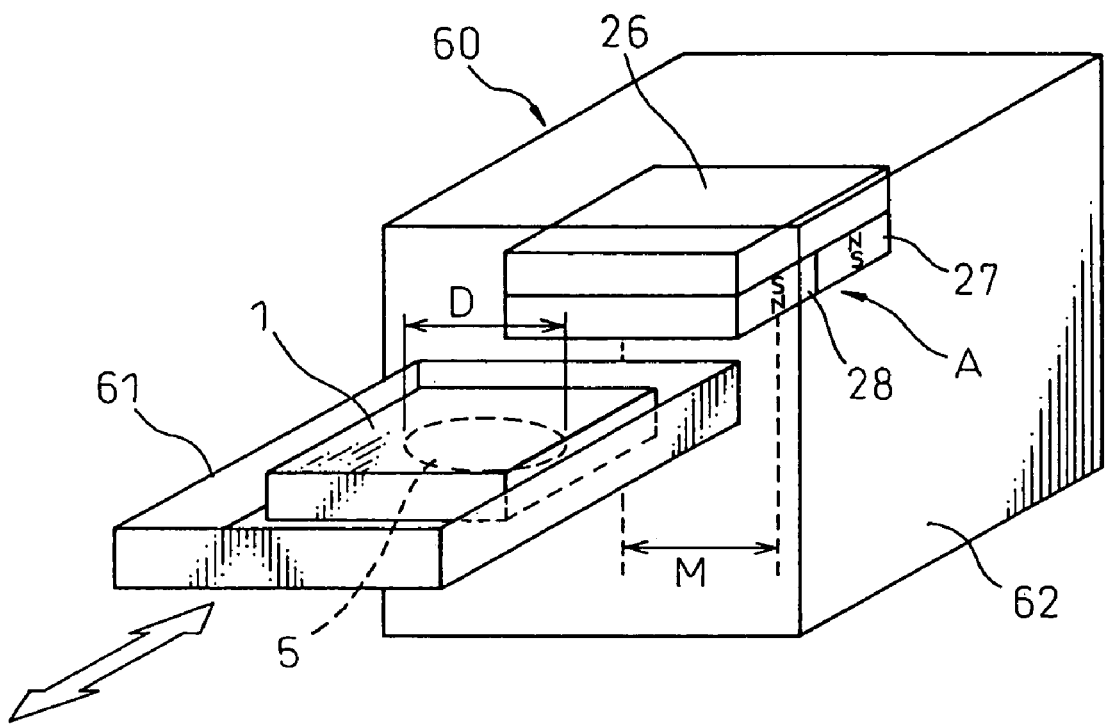
FIG. 2A is a perspective view showing a configuration of a data erasing device that the inventors of the present invention previously proposed.
Figure 2B:
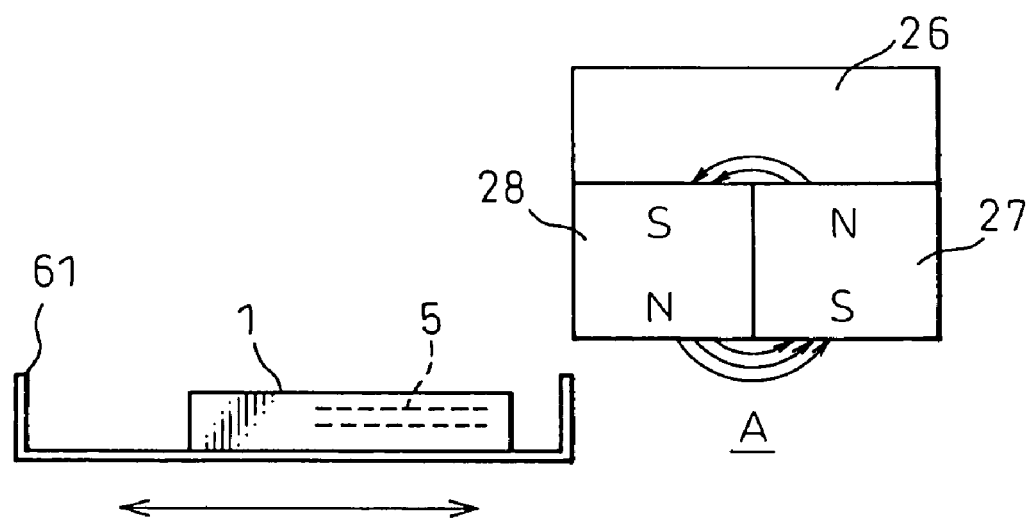
FIG. 2B is an explanatory diagram for explaining the principle of erasing data from a magnetic disk device by the data erasing device shown in FIG. 2A.

FIG. 2A shows a configuration of a data erasing device 60 previously proposed by the inventors of the present invention. FIG. 2B is a diagram for explaining the principle of erasing data from the magnetic disk device 1 by the data erasing device 60. The data erasing device 60 comprises a case 62 incorporating two permanent magnets 27 and 28 (the permanent magnets are hereinafter simply referred to as magnets) arranged adjacent to each other on a yoke 26, a drawer-type tray 61 constructed so as to be freely extractable from and insertable into the case 62. A magnetic disk device 1 which is the magnetic recording medium whose data is to be erased is mounted on the tray 61 and is extracted from and inserted into the case 62.

Also, the yoke 26 is fixed to the ceiling side of the case 62, and the magnets 27 and 28 are arranged in the forward and backward directions with respect to the path of the tray 61 inside the case 62. The widths of the magnets 27 and 28 are formed larger than the width of the magnetic disk device 1. In addition, the magnets 27 and 28 are arranged such that the magnet 28 is disposed at the entrance side of the case 62, with its south pole at the yoke 26 side and its north pole at the external side, and the magnet 27 is disposed at the far side from the entrance side of the case, with its north pole at the yoke 26 side and its south pole at the external side. Also, the magnetic disk device 1 from which data is to be erased is mounted on this tray 61 so as to be inserted into and extracted from the case 62. Usually, a groove (i.e., a recess) is provided on the tray 61 to accommodate the magnetic disk device 1.

Further, a magnetic field indicated by a reference symbol A in FIG. 2B is generated inside the case 62 by the magnets 27 and 28 arranged inside the case 62. This magnetic field A is formed by magnetic flux directed from the magnet 28 toward the magnet 27, and the magnetic field A at the border portion of the magnets 27 and 28 has a horizontal component. Because the magnets 27 and 28 are disposed at the front of the case 62, the data recorded on the magnetic disk 5 inside the magnetic disk device 1 is erased by the magnetic field A, when the tray 61 mounted with the magnetic disk 1 is inserted into and extracted from the case 62 at least once.

Thereafter, when the same operation is performed by turning the magnetic disk device 1 mounted on the tray 61 upside down, the data recorded on the magnetic disk 5 inside the magnetic disk device 1 can be securely erased. In FIG. 2A, a path along which the tray 61 is moved into and out of the case 62, and a handle provided on the tray 61, are omitted.

In the data erasing device 60 shown in FIG. 2, the size of the magnets 27 and 28 is increased, and a maximum magnetic flux region M is substantially the same as a diameter D of the magnetic disks 5 in the magnetic disk device 1. Consequently, due to the magnets 27 and 28 having a large size, the weight of the data erasing device 60 increases, and the cost of the device also increases.

Figure 3A:
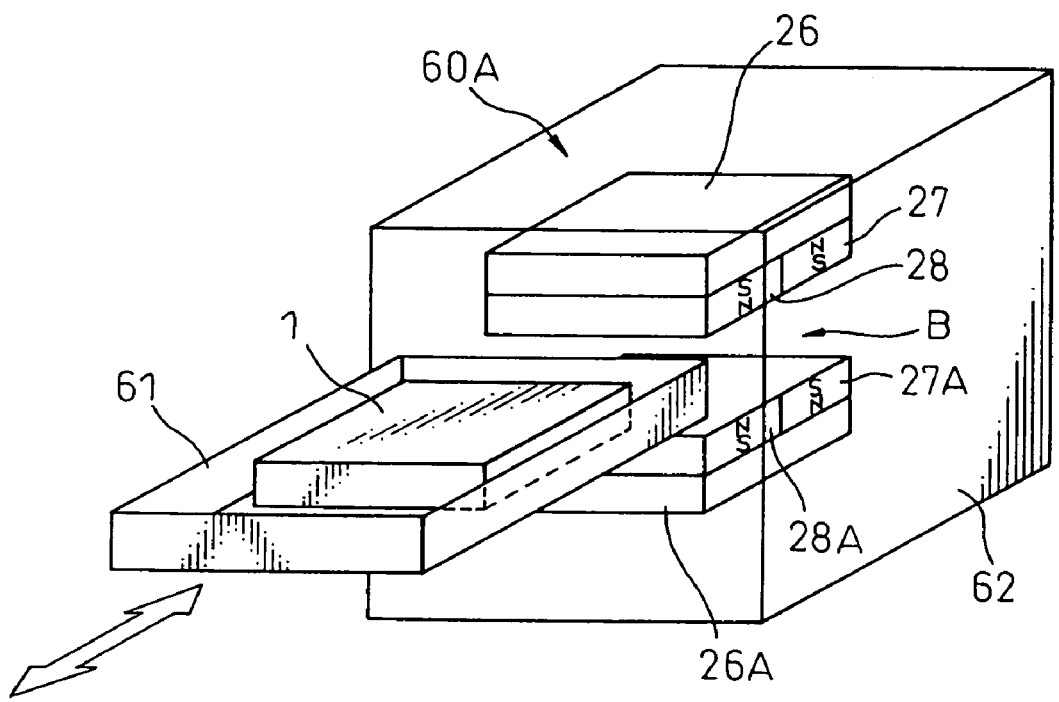
FIG. 3A is a perspective view showing another configuration of the data erasing device that the inventors of the present invention previously proposed.
Figure 3B:
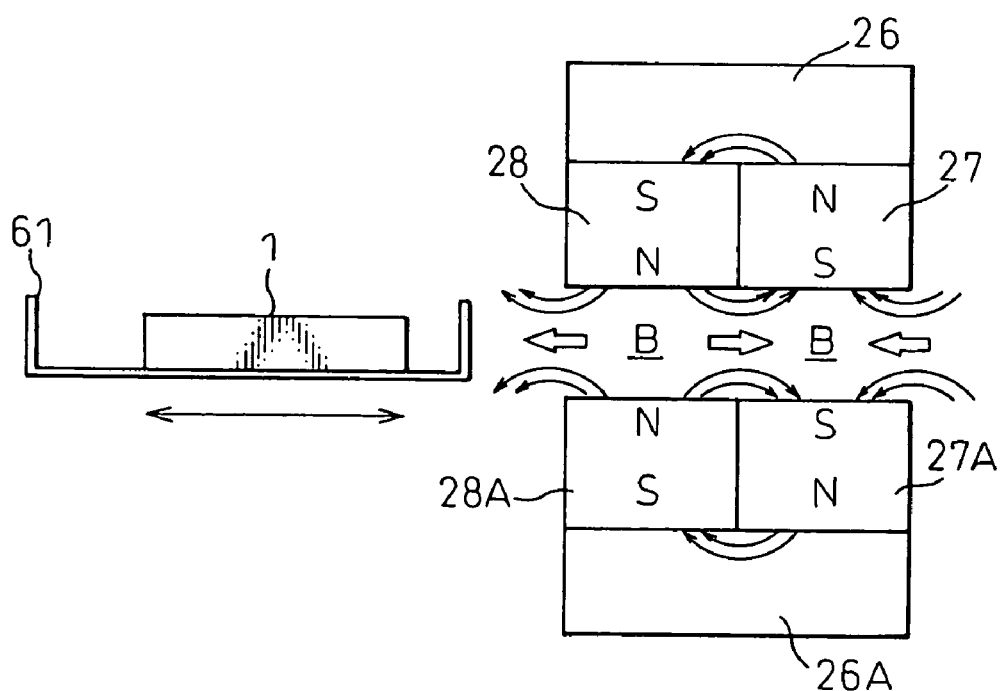
FIG. 3B is an explanatory diagram for explaining the principle of erasing data from a magnetic disk device by the data erasing device shown in FIG. 3A.

FIG. 3A is a configuration diagram of a data erasing device 60A showing another configuration of the data erasing device previously proposed by the inventors of the present invention. FIG. 3B is an explanatory diagram of the principle of erasing data from the magnetic disk device 1 by the data erasing device 60A. The data erasing device 60A is different from the data erasing device 60 explained with reference to FIG. 2, in that the case 62 incorporates another set of two magnets 27 and 28 disposed adjacently to the first set on the yoke 26. The configuration of the draw-type tray 61 that can be freely put into and out of the case 62 is the same as that of the tray 61 explained with reference to FIG. 2.

The second set of the magnets 27A and 28A are constructed in planar symmetry to the magnets 27 and 28 attached to the ceiling portion of the case 62, with respect to the path of the tray 61, within the case 62. The widths of the magnets 27 and 28 are the same as those of the magnets 27A and 28A, and these widths are formed larger than the width of the magnetic disk device 1. Among the magnets 27 and 28 and the magnets 27A and 28A, the magnets 28 and 28A whose south poles are on the yoke 26 and 26A sides and north poles are on the external sides are arranged toward the entrance of the case 62, and the magnets 27 and 27A whose north poles are on the yoke 26 and 26A sides and south poles are on the external sides are arranged on the far side from the entrance of the case 62. The magnetic disk device 1 from which data is to be erased is mounted on the tray 61 and the tray is moved into and out of the case 62.

The magnets 27 and 28 and the magnets 27A and 28A arranged inside the case 62 generate a magnetic field indicated by a reference symbol B in FIG. 3B. This magnetic field B includes a magnetic flux directed from the magnet 28 to the magnet 27 and a magnetic flux directed from the magnet 28A toward the magnet 27A. The magnetic field B at the border portion between the magnets 27 and 28 and the border portion between the magnets 27A and 28A has a component in the horizontal direction. Because the magnets 27 and 28 and the magnets 27A and 28A are disposed at the front of the case 62, the data recorded on the magnetic disk 5 within the magnetic disk device 1 is erased by the magnetic field B when the tray 61 mounted with the magnetic disk device 1 is put into and out of the case 62, at least once, in the magnetic field B generated by the magnets.

In the data erasing device 60A, because the magnetic disk device 1 moves on the path between where the magnets 27 and 28 and magnets 27A and 28A are arranged in a planar symmetry, and the magnetic field B is present above and below the magnetic disk device 1, the same operation does not need to be repeated by inverting the magnetic disk device 1 mounted on the tray 61. In FIG. 3A, a path along which the tray 61 is moved into and out of the case 62, a handle provided on the tray 61, and a groove for accommodating the magnetic disk device 1 provided on the tray are omitted.

In the data erasing device 60A shown in FIG. 3A, the sizes of the magnets 27 and 28 and the magnets 27A and 28A are increased. Consequently, the maximum magnetic flux region M of the magnets 27 and 28 and the magnets 27A and 28A is the same as the diameter D of the magnetic disks 5 in the magnetic disk device 1. Therefore, in the data erasing device 60A, the sizes of the magnets 27 and 28 and the magnets 27A and 28A can be decreased.

Figure 4A:
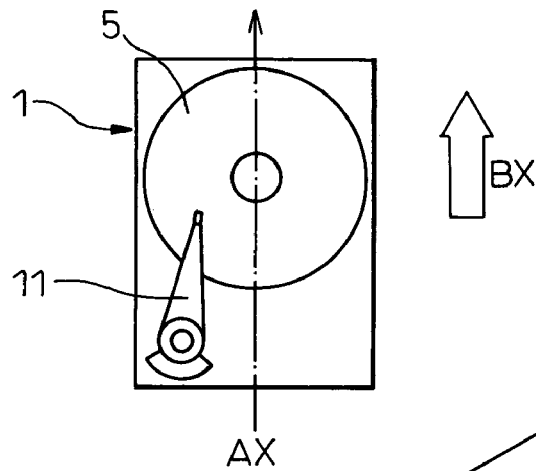
FIG. 4A is a top plan view for explaining an application direction of an external erasing magnetic field to be applied to a magnetic recording medium by the data erasing device that the inventors of the present invention previously proposed.

FIG. 4A is an explanatory diagram of a direction of applying an external erasing magnetic field to the magnetic recording medium 1 by the data erasing device previously proposed by the inventors of the present invention. A reference symbol 5 denotes a magnetic disk, and 11 denotes an actuator. In the data erasing device previously proposed by the inventors of the present invention, a direction of an external erasing magnetic field BX for demagnetizing the data stored in the magnetic disk 5 is parallel with the direction of an axis line AX of the magnetic disk device 1.

Figure 4B:
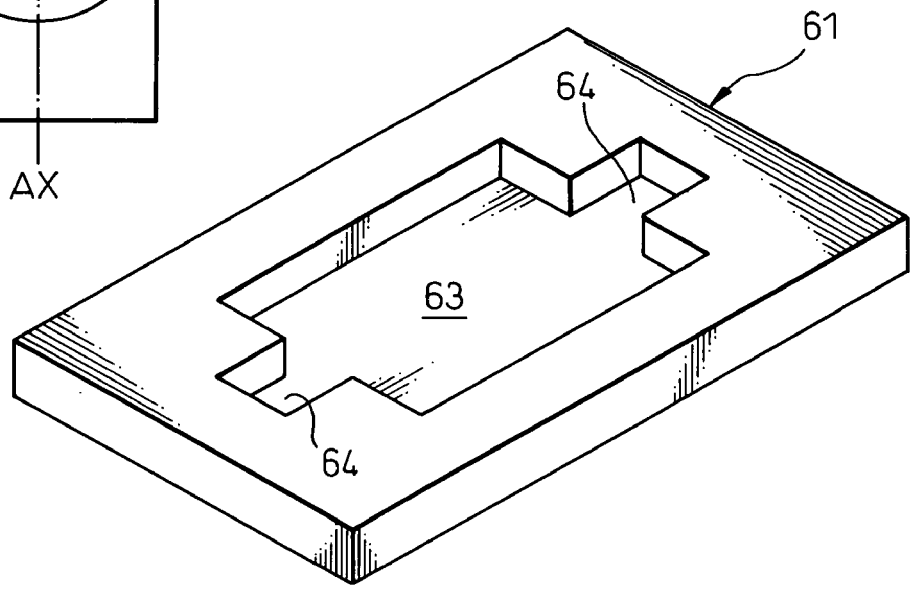
FIG. 4B is a perspective view showing the shape of a tray having an accommodation groove of the magnetic disk device used in the data erasing device shown in FIGS. 2A and 2B and FIGS. 3A and 3B.

FIG. 4B is an explanatory diagram of a shape of the tray 61 that is used in the data erasing devices 60 and 60A shown in FIG. 2 and FIG. 3 respectively. An accommodation groove 63 in which the magnetic disk device 1 is to be fixed is formed on the tray 61. Auxiliary grooves 64 formed at the upper and lower parts of the accommodation groove 63 are designed to facilitate taking out the magnetic disk device 1 from the accommodation groove 63. These auxiliary grooves 64 are not particularly required.

Figure 4C:
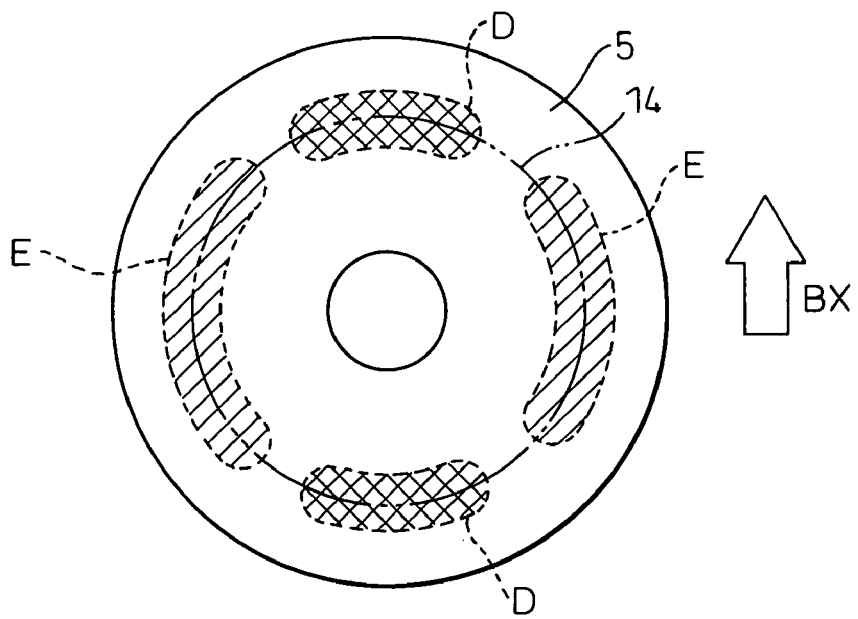
FIG. 4C is an explanatory diagram showing an area of the magnetic disk from which data can be erased easily and an area of the magnetic disk from which data cannot be erased easily by the external erasing magnetic field shown in FIG. 4A.

FIG. 4C is an explanatory diagram showing a state that the magnetic disk 5 from which data is to be erased by the external erasing magnetic field BX in the direction shown in FIG. 4A has an area E from which the data can be demagnetized easily and an area D from which the data cannot be demagnetized easily. When the direction of the external erasing magnetic field BX for demagnetizing the data stored in the magnetic disk 5 shown in FIG. 4A is parallel with the direction of the axis line AX of the magnetic disk device 1, the data in a data cylinder 14 parallel with the direction of the external erasing magnetic field BX on the magnetic disk 5 (i.e., the data in the area indicated by E in FIG. 4C) can be demagnetized easily. However, the data in the data cylinder 14 perpendicular to the direction of the external erasing magnetic field BX on the magnetic disk 5 (i.e., the data in the area indicated by D in FIG. 4C) cannot be demagnetized easily.

Therefore, in order to sufficiently erase the data from the area D shown in FIG. 4C as well, a large magnet is used in the magnetic circuit that generates the erasing magnetic field. Consequently, this brings about the increase in the size of the data erasing device, the increase in the weight of the device, and the increase in the size of the magnetic shielding mechanism that prevents the magnetism from being leaked to the outside, resulting in high cost of the data erasing device.

Figure 5A:
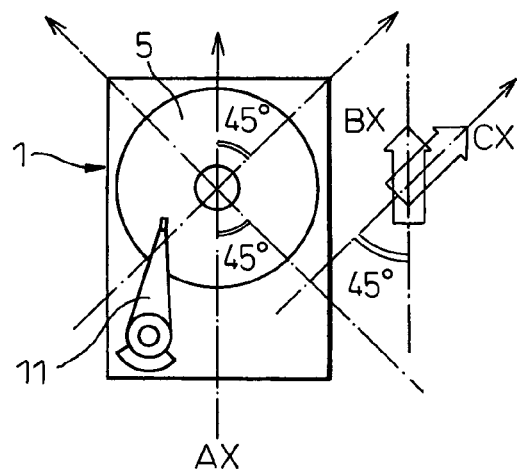
FIG. 5A is a top plan view for explaining an application direction of an external erasing magnetic field to be applied to a magnetic recording medium by the data erasing device according to the present invention.

FIG. 5A is an explanatory diagram of a direction of applying an external erasing magnetic field to the magnetic disk 5 in the magnetic disk device 1 by the data erasing device according to the present invention. A reference numeral 11 denotes an actuator. According to the data erasing device of the present invention, in addition to the external erasing magnetic field BX to be applied to the magnetic disk device 1 in a direction parallel with the direction of the axis line AX of the magnetic disk device 1, an external erasing magnetic field CX is also applied to the magnetic disk device 1 in a direction inclined to the direction of the axis line AX of the magnetic disk device 1.

It is preferable that the direction of the external erasing magnetic field CX additionally applied to the magnetic disk device 1 forms an angle of 45 degrees with the direction of the axis line AX of the magnetic disk device 1 at the right side or the left side of the axis line AX. This inclination may be at another angle. Alternatively, the direction of the external erasing magnetic field CX additionally applied to the magnetic disk device 1 can form a right angle with the direction of the axis line AX of the magnetic disk device 1. In the embodiments explained below, the direction of the external erasing magnetic field CX additionally applied to the magnetic disk device 1 forms the angle of 45 degrees with the direction of the axis line AX of the magnetic disk device 1.

In other words, according to the data erasing device of the present invention, the tray 61 of the data erasing devices 60 and 60A explained with reference to FIGS. 2 and 3 is changed. Trays according to embodiments of the present invention that takes the place of the tray 61 will be explained below.

Figure 5B:
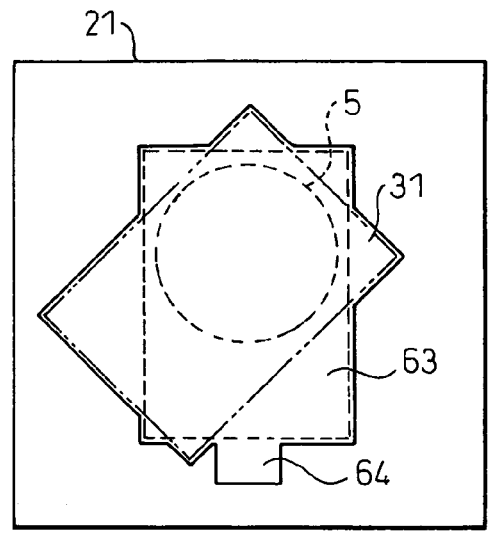
FIG. 5B is a top plan view showing a shape of a tray according to a first embodiment, having a disk device accommodation groove of a first shape, used in the data erasing device according to the present invention.

FIG. 5B is an explanatory diagram of the shape of a tray 21 according to a first embodiment that is used in the data erasing device according to the present invention. The tray 21 according to the first embodiment has a disk device accommodation groove 31 that is inclined by 45 degrees from the center line of the disk device accommodation groove 63 explained with reference to FIG. 4B, in addition to the disk device accommodation groove 63 and the auxiliary grooves 64. The disk device accommodation groove 31 is provided such that the position of the magnetic disk 5 within the magnetic disk device 1 when the magnetic disk device 1 is accommodated in the groove 31 is the same as the position of the magnetic disk 5 within the magnetic disk device 1 when the magnetic disk device 1 is accommodated in the disk device accommodation groove 63. With this arrangement, the width of the demagnetizing circuit incorporated in the data erasing device can be decreased.

In order to erase the data from the magnetic disk device 1 by using the tray 21 according to the first embodiment, the magnetic disk device 1 is accommodated in the disk device accommodation groove 63 of the tray 21, and a first demagnetizing operation is executed by inserting and extracting the tray 21 into and from the data erasing device 60A explained with reference to FIG. 3. Next, the magnetic disk device 1 is accommodated in the disk device accommodation groove 31 of the tray 21, and a second demagnetizing operation is executed by inserting and extracting the tray 21 into and from the data erasing device 60A explained with reference to FIG. 3.

According to the present invention, the demagnetizing operation in the direction parallel with the center line of the magnetic disk device 1 and the demagnetizing operation in the direction inclined from the center line of the magnetic disk device 1 are carried out, as explained above. Therefore, the magnet used in the data erasing device 60A shown in FIG. 3 can be made small, and the weight of the data erasing device 60A can be decreased. Consequently, the cost of the device can be decreased.

Figure 5C:
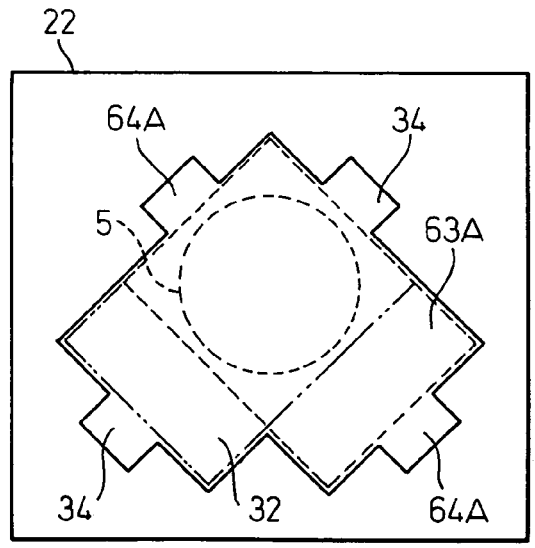
FIG. 5C is a top plan view showing a shape of a tray according to a second embodiment, having a disk device accommodation groove of a second shape, used in the data erasing device according to the present invention.

FIG. 5C is an explanatory diagram of the shape of a tray 22 according to a second embodiment that is used in the data erasing device according to the present invention. The tray 22 according to the second embodiment has a disk device accommodation groove 32 and a disk device accommodation groove 64A that are inclined by 45 degrees from the center line of the tray 22 to the left and to the right of the center line of the tray 22 respectively. The disk device accommodation groove 32 and the disk device accommodation groove 63A are provided such that the position of the magnetic disk 5 within the magnetic disk device 1 when the magnetic disk device 1 is accommodated in the groove 32 is the same as the position of the magnetic disk 5 within the magnetic disk device 1 when the magnetic disk device 1 is accommodated in the disk device accommodation groove 63A.

In order to erase the data from the magnetic disk device 1 by using the tray 22 according to the second embodiment, the magnetic disk device 1 is accommodated into the disk device accommodation groove 32 of the tray 22, and a first demagnetizing operation is executed by inserting and extracting the tray 22 into and from the data erasing device 60A explained with reference to FIG. 3. Next, the magnetic disk device 1 is accommodated into the disk device accommodation groove 63A of the tray 22, and a second demagnetizing operation is executed by inserting and extracting the tray 22 into and from the data erasing device 60A explained with reference to FIG. 3.

When the tray 22 according to the second embodiment is used, the data erasing operation is carried out in two directions by inclining the direction of the tray 22 by 45 degrees from the center line of the magnetic disk device 1 to the left and to the right of the center line respectively. Therefore, the magnet used in the data erasing device 60A shown in FIG. 3 can be made small, and the weight of the data erasing device 60A can be decreased. Consequently, the cost of the device can be decreased.

Figure 5D:
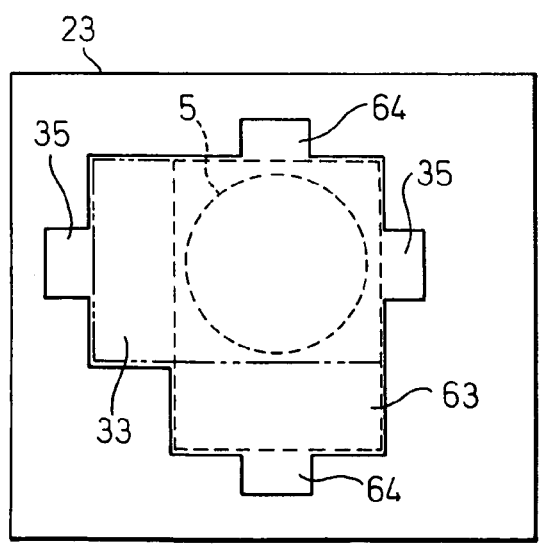
FIG. 5D is a top plan view showing a shape of a tray according to a third embodiment, having a disk device accommodation groove of a third shape, used in the data erasing device according to the present invention.

FIG. 5D is an explanatory diagram of the shape of a tray 23 according to a third embodiment that is used in the data erasing device according to the present invention. The tray 23 according to the third embodiment has a disk device accommodation groove 33 and auxiliary grooves 35 that are inclined by 90 degrees from the center line of the disk device accommodation groove 63 explained with reference to FIG. 4B, in addition to the disk device accommodation groove 63 and the auxiliary grooves 64. The disk device accommodation groove 33 is provided such that the position of the magnetic disk 5 within the magnetic disk device 1 when the magnetic disk device 1 is accommodated in the groove 33 is the same as the position of the magnetic disk 5 within the magnetic disk device 1 when the magnetic disk device 1 is accommodated in the disk device accommodation groove 63.

In order to erase the data from the magnetic disk device 1 by using the tray 23 according to the third embodiment, the magnetic disk device 1 is accommodated in the disk device accommodation groove 63 of the tray 23, and a first demagnetizing operation is executed by inserting and extracting the tray 21 into and from the data erasing device 60A explained with reference to FIG. 3. Next, the magnetic disk device 1 is accommodated in the disk device accommodation groove 33 of the tray 23, and a second demagnetizing operation is executed by inserting and extracting the tray 23 into and from the data erasing device 60A explained with reference to FIG. 3.

In the data erasing operation using the tray 23 according to the third embodiment, the data erasing operation in the direction parallel with the center line of the magnetic disk device 1 and the data erasing operation in the direction inclined from the center line of the magnetic disk device 1 are also carried out. Therefore, the magnet used in the data erasing device 60A shown in FIG. 3 can be made small, and the weight of the data erasing device 60A can be decreased. Consequently, the cost of the device can be decreased.

According to the first to the third embodiments explained above, only the tray 61 of the data erasing devices 60 and 60A explained with reference to FIGS. 2 and 3 is explained with any one of the trays 21 to 23 of the present invention. According to a fourth embodiment explained next, the whole data erasing device is changed.

Figure 6A:
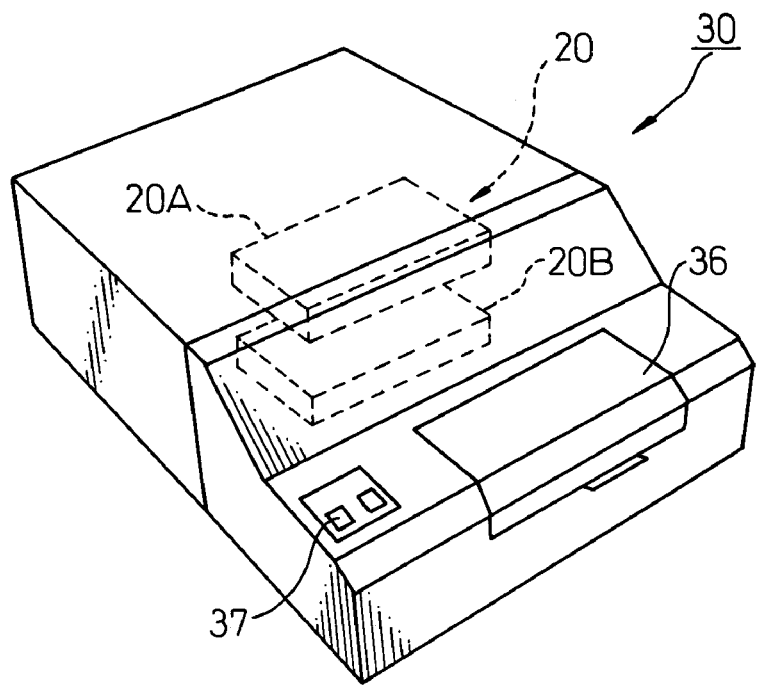
FIG. 6A is a perspective view showing a total configuration of a data erasing device having a tray according to a fourth embodiment of the present invention.

FIG. 6A is a perspective view showing a total configuration of a data erasing device 30 having the tray according to the fourth embodiment of the present invention. In the fourth embodiment, the tray described later is incorporated in the device, and the tray cannot be extracted from the data erasing device like the tray 61 that is extracted from the data erasing devices 60 and 60A explained with reference to FIG. 2A to FIG. 3B. A door 36 is provided at the front of the data erasing device 30. The tray incorporated in the device is drawn out from the device by opening the door 36, and a magnetic disk device having a magnetic disk to be demagnetized is set into this tray. After the magnetic disk device is set to the tray, a start switch 37 is depressed. Then, the tray automatically carries out a reciprocal movement within the data erasing device 30.

A demagnetizing circuit 20, which is similar to the data erasing device 60A explained with reference to FIG. 3A, is provided within the data erasing device 30. This demagnetizing circuit 20 includes an upper demagnetizing circuit 20A consisting of the yoke 26, and the magnets 27 and 28, and a lower demagnetizing circuit 20B consisting of the yoke 26A, and the magnets 27A and 28A.

Figure 6B:
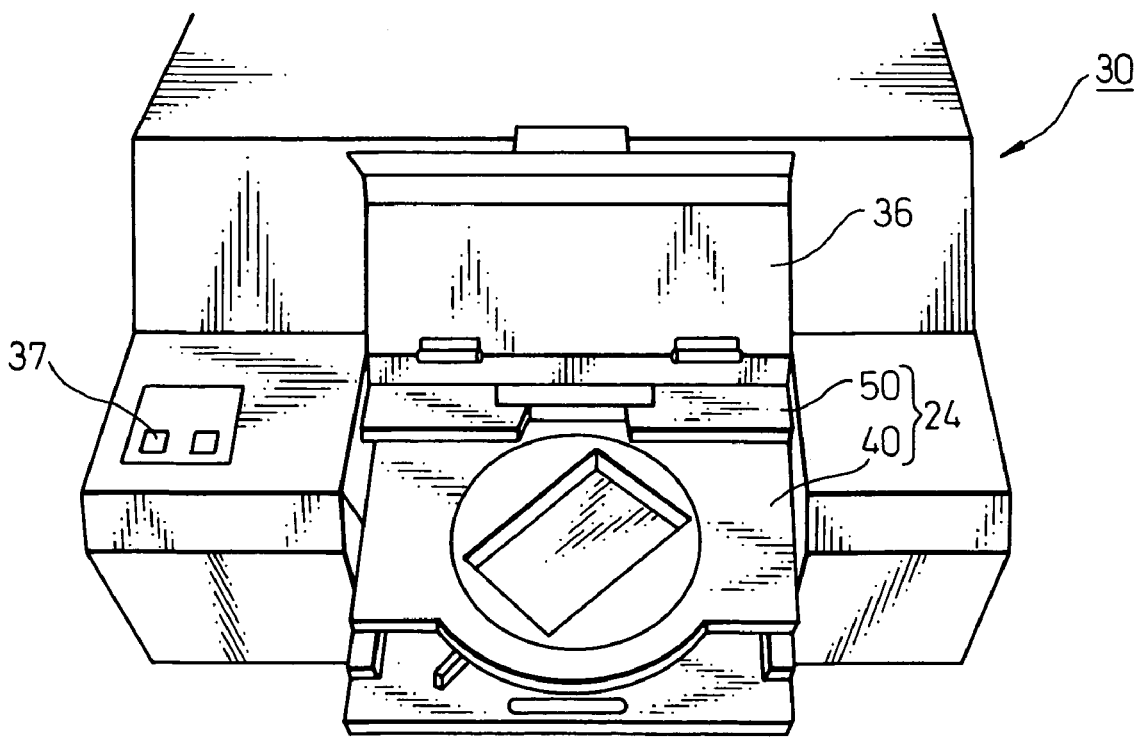
FIG. 6B is a partially enlarged perspective view of the data erasing device showing a state that a part of the tray is drawn out from the data erasing device shown in FIG. 6A.

FIG. 6B is a partially enlarged perspective view of the data erasing device 30 shown in FIG. 6A showing a state that a part of a tray 24 is drawn out from the data erasing device 30 according to the fourth embodiment. The tray 24 according to the fourth embodiment consists of an inner tray 40 and an outer tray 50. When the door 36 is opened, the outer tray 50 remains within the data erasing device 30, and the inner tray 40 is drawn out from the outer tray 50.

Figure 7A:
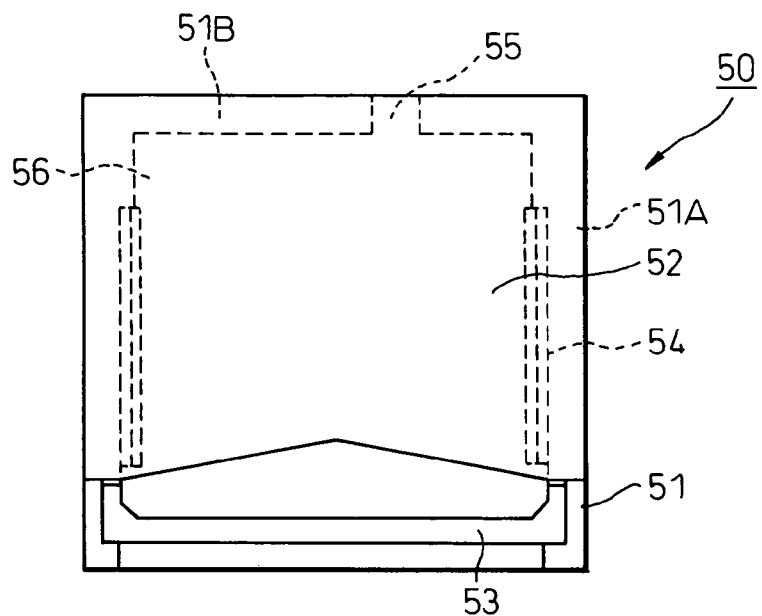
FIG. 7A is a top plan view showing a configuration of an outer tray that constitutes the tray used in the data erasing device according to the fourth embodiment of the present invention shown in FIGS. 6A and 6B.
Figure 7B:
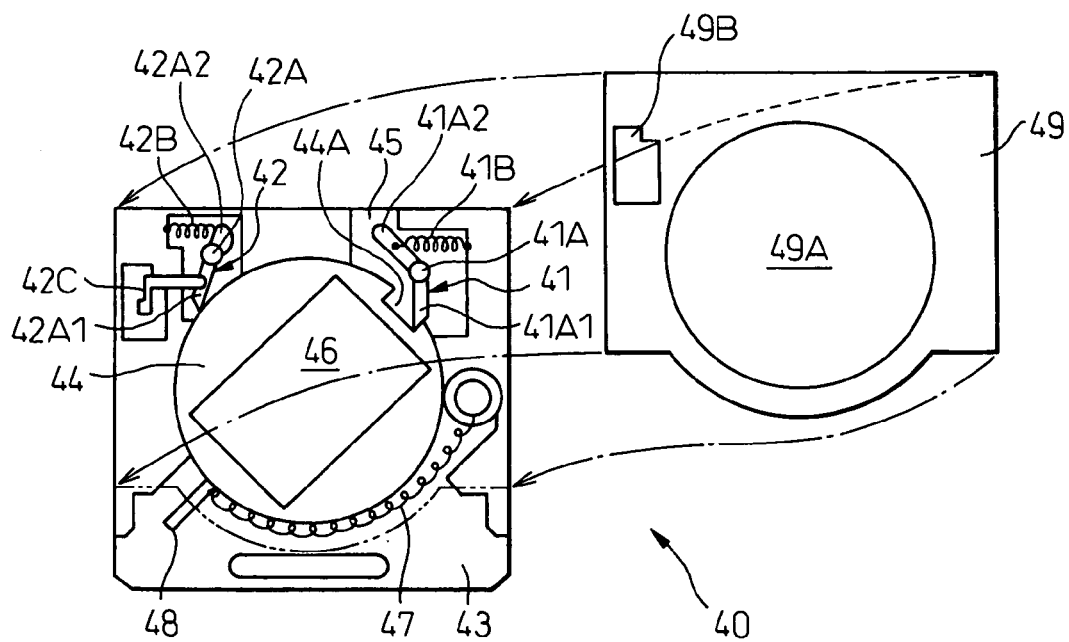
FIG. 7B is an assembly diagram showing a configuration of an inner tray which is combined with the outer tray shown in FIG. 7A.

FIG. 7A is a top plan view showing a configuration of the outer tray 50 that constitutes the tray used in the data erasing device according to the fourth embodiment of the present invention shown in FIG. 6B. FIG. 7B is an assembly diagram showing a configuration of the inner tray 40 which is combined with the outer tray 50 shown in FIG. 7A. The inner tray 40 is built into the outer tray 50, and is configured to be able to be drawn out from the outer tray 50.

The outer tray 50 includes a base 51 having opposed sidewalls 51A and a back wall 51B, and a cover 52 covering the upper surface of the base 51. An area 56 on the base 51 encircled by both sidewalls 51A and the back wall 51B of the outer tray 50 is the inner tray accommodation section 56 for accommodating the inner tray 40. A sliding mechanism 54, on which the inner tray 40 is fitted and is moved, is provided inside the sidewalls 51A. A through hole 55 through which a push rod described later is passed is provided at a predetermined position of the back wall 51B.

An opening is formed at the front of the outer tray 50. A rotation gate 53 is fitted to the opening to prevent the accommodated inner tray 40 from skipping out from the outer tray 50. The inner tray 40 can move to the outer tray 50 in the state that the rotation gate 53 is open.

The inner tray 40 includes a base 43, and a cover 49 fitted to above the base 43. Both side surfaces of the base 43 of the inner tray 40 are fitted to the sliding mechanism 54 of the outer tray 50. A disk-shaped rotation plate 44 rotatably fitted to the base 43 is provided at the center of the inner tray 40. A disk device accommodation groove 46 for accommodating the magnetic disk device 1 is provided on the rotation plate 44. Auxiliary grooves usually provided on the disk device accommodation groove 46 is omitted from FIG. 7B.

A square latch groove 44C is provided at the external periphery of the rotation plate 44, and a lever 48 for externally rotating the rotation plate 44 is provided in projection at a position on substantially a diagonal line of the latch groove 44C. According to the present embodiment, a tension spring 47 is provided between the proximity of the base of the lever 48 and a predetermined position of the base 43 around the rotation plate 44 (i.e., at one side surface side of the base 43). The tension spring 47 gives rotation force to the rotation plate 44 to rotate the rotation plate 44 in the counterclockwise direction.

On the other hand, a through hole 45 that is communicated to the through hole 55 of the outer tray 50 is formed on the inner tray 40 at a position that faces the through hole 55 when the inner tray 40 is accommodated in the outer tray 50. A first latch lever 41 is provided in the area of the base 43 between the through hole 45 and the surrounding of the rotation plate 44. The first latch lever 41 has a first arm 41A and a second arm 41A2 that are supported by a rotation axis 41A. A free end of the second arm 41A2 is positioned in the through hole 45. A tension spring 41B is provided between the second arm 41A2 and the base 43. This spring 41B presses the front end of the first arm 41A1 against the circumferential part of the rotation plate 44.

Therefore, when the rotation plate 44 is rotated in the clockwise direction by external force applied to the lever 48, the front end of a first arm 41A1 enters a latch groove 44A formed on the rotation plate 44 when the latch groove 44A comes to the position of the first latch lever 41. When the external force applied to the lever 48 is not present in this state, the rotation plate 44 is biased to rotate in the counterclockwise direction by the spring 47. However, this rotation is stopped by the first arm 41A1 that is in the latch groove 44A. This state is shown in FIG. 7B. In this state, the center line of the disk device rotation groove 46 provided on the rotation plate 44 is inclined by 45 degrees from the center line of the inner tray 40 in the clockwise rotation direction.

A second latch lever 42 is provided on the base 43 at the side opposite to the side where the first latch lever 41 is provided. The second latch lever 42 has a first arm 42A1 and a second arm 42A2 supported by a rotation axis 42A. A tension spring 42B is provided between the second arm 42A and the base 43. This spring 42B presses the front end of the first arm 42A1 against the peripheral part of the rotation plate 44. A release lever 42C capable of moving the first arm 42A1 from the peripheral part of the rotation plate 44 is connected to the first arm 42A1.

The cover 49 is fitted to a position indicated by a chain double-dashed line on the base 43. When the cover 49 is fitted to the base 43, the front end of the lever 48 provided in projection on the rotation plate 44 is exposed from the edge of the cover 49. The cover 49 is provided with a circular hole 49A that is superimposed with the rotation plate 44 when the cover 49 is fitted to the base 43, and a release hole 49B that is superimposed with the release lever 42 when the cover 49 is fitted to the base 43.

Figure 8A:
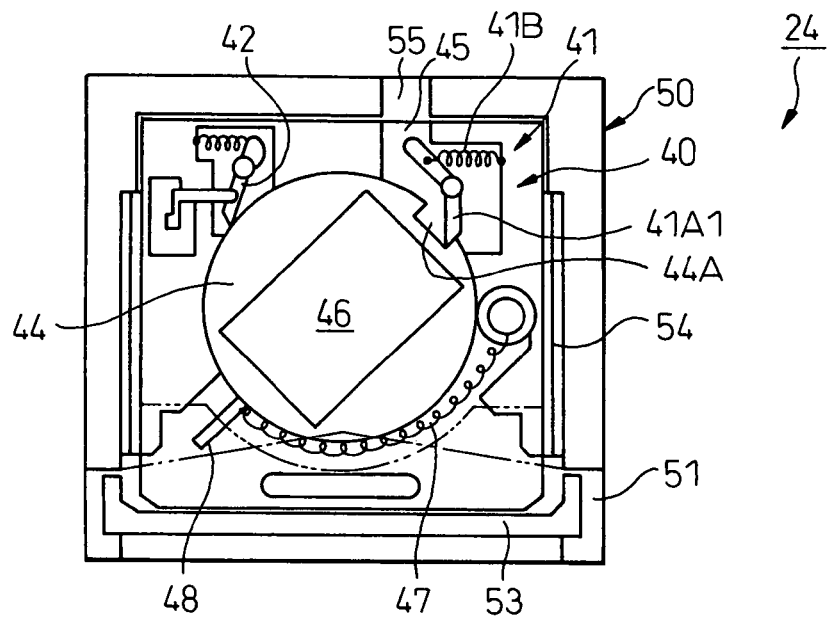
FIG. 8A is a top plan view showing the tray according to the fourth embodiment in a state that the inner tray is accommodated in the outer tray shown in FIG. 7A.

FIG. 8A is a top plan view showing the tray 24 according to the fourth embodiment in a state that the inner tray 40 is accommodated in the outer tray 50 shown in FIG. 7A. In the state that the inner tray 40 is accommodated in the outer tray 50, the rotation gate 53 provided on the outer tray 50 is positioned on the base 51, and the inner tray 40 does not skip out from the outer tray 50. In order to facilitate the understanding of the internal configuration of the tray 24, the cover 49 of the inner tray 40 and the cover 52 of the outer tray 50 are not shown in FIG. 8A. The tray 24 is incorporated in the data erasing device 30 shown in FIG. 6A, in the state shown in FIG. 8A.

Figure 8B:
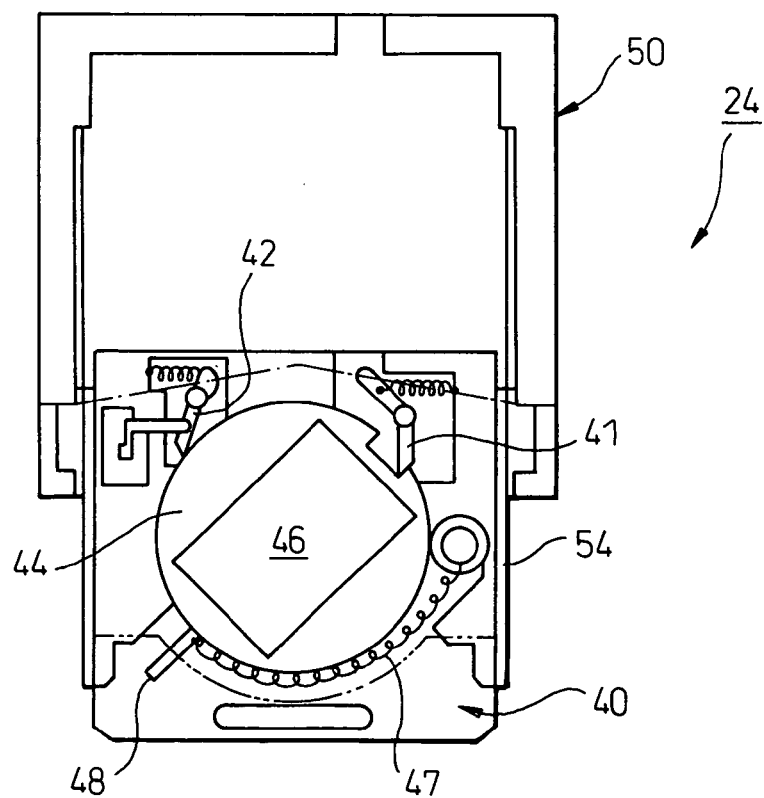
FIG. 8B is a top plan view showing a state that the inner tray is drawn out from the outer tray shown in FIG. 8A.

FIG. 8B is a top plan view showing a state that the rotation gate 53 of the tray 24 shown in FIG. 8A is open, and the inner tray 40 is drawn out from the outer tray 50. The inner tray 40 can be drawn out from the outer tray 50 either automatically or manually. This state corresponds to the state shown in FIG. 6B.

Figure 9A:
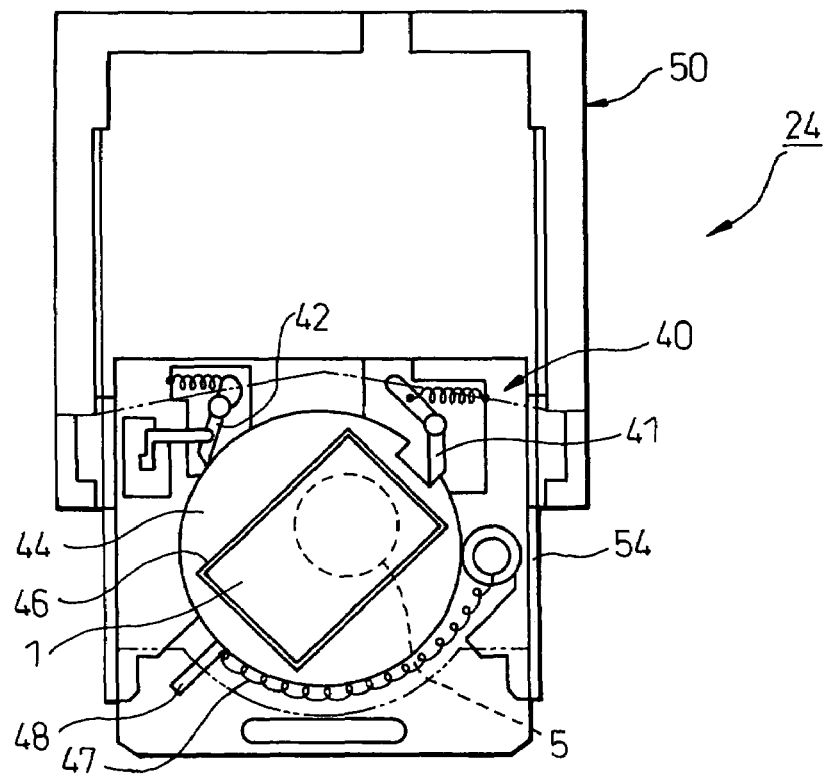
FIG. 9A is a top plan view showing the outlay in a state that a magnetic disk device is set to the inner tray according to the fourth embodiment shown in FIG. 8B.
Figure 9B:
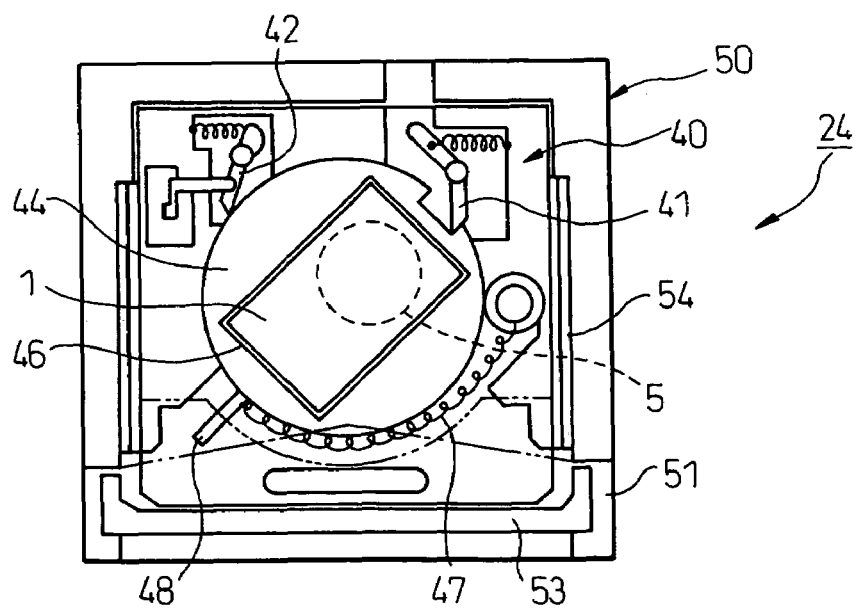
FIG. 9B is a top plan view showing a state that the inner tray is accommodated in the outer tray in the tray according to the fourth embodiment shown in FIG. 9A.

FIG. 9A is a top plan view showing the tray 24 in a state that the magnetic disk device 1 is set to the disk accommodation groove 46 of the inner tray 40 shown in FIG. 8B. The inner tray 40 in which the magnetic disk device 1 is set is returned to the outer tray 50 either automatically or manually. FIG. 9B is a top plan view showing a state that the tray 24 on which the magnetic disk device 1 is set is accommodated in the outer tray 50.

Figure 10A:
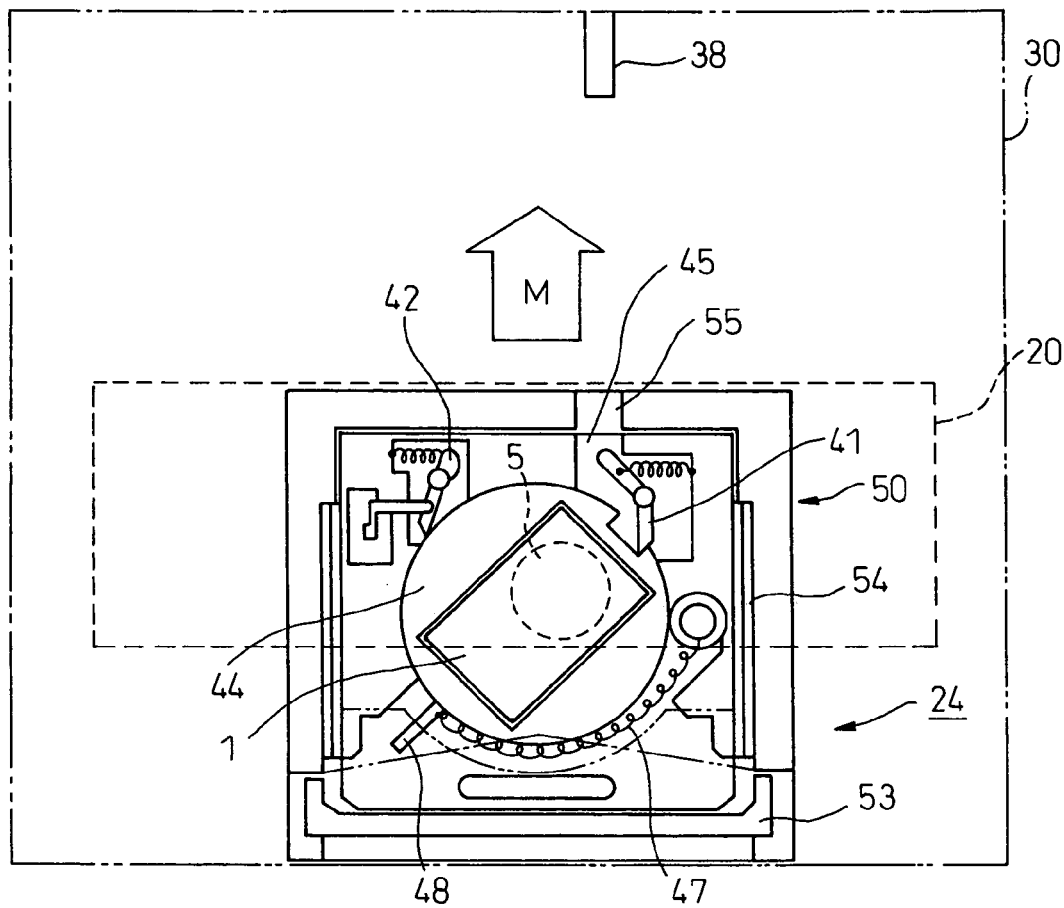
FIG. 10A is an explanatory diagram showing an initial position of the tray shown in FIG. 9B, within the data erasing device according to the fourth embodiment shown in FIGS. 6A and 6B.

FIG. 10A is an explanatory diagram showing an initial position of the tray 24 shown in FIG. 9B, within the data erasing device 30 according to the fourth embodiment shown in FIGS. 6A and 6B. The tray 24 accommodating the magnetic disk device 1 moves from the initial position to a direction of an arrowhead M within the data erasing device 30. As explained with reference to FIG. 6A, the demagnetizing circuit 20 is provided within the data erasing device 30. The magnetic disk device 1 passes through between the demagnetizing circuits 20A and 20B while the tray 24 moves within the data erasing device 30. Consequently, the data recorded in the magnetic disk 5 is erased by the demagnetizing circuit 20.

Figure 10B:
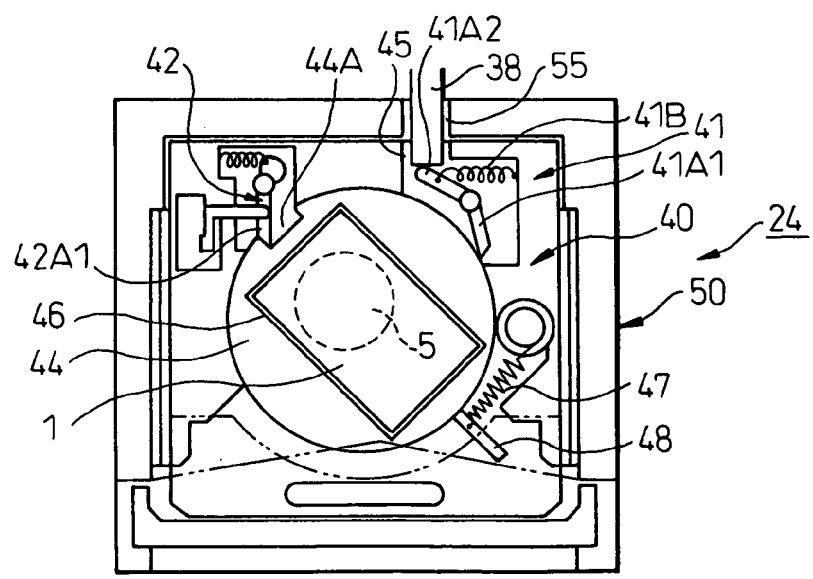
FIG. 10B is a top plan view showing a state that the tray shown in FIG. 10A moves within the data erasing device and is brought into contact with a bush bar provided within the data erasing device according to the fourth embodiment.

A push rod 38 is provided in projection on the inner wall at the back surface side of the data erasing device 30 at a position corresponding to the through hole 55 of the tray 24. When the tray 24 moves within the data erasing device 30 and reaches an end position (i.e., the end of the path), the push rod 38 enters the through hole 55 of the tray 24, reaches the through hole 45, and pushes the second arm 41A2 of the first latch lever 41 positioned within the through hole 45, as shown in FIG. 10B. When the second arm 41A2 is pushed, the first latch lever 41 rotates against the force of the spring 41B.

When the first latch lever 41 rotates, the first arm 41A1 is disengaged from the latch groove 44A of the rotation plate 44, and the rotation plate 44 rotates in the counterclockwise direction based on the tensile force of the spring 47, and reaches the state shown in FIG. 10B. In this state, the spring 47 is not compressed any more, and the rotation plate 44 stops rotating. At the same time, the first arm 42A1 of the second latch lever 42 enters the latch groove 44A of the rotation plate 44. As a result, the rotation of the rotation plate 44 in the clockwise and the counterclockwise directions is stopped. In this state, the center line of the magnetic disk 1 accommodated in the disk device rotation groove 46 provided on the rotation plate 44 is inclined by 45 degrees from the center line of the inner tray 40 in the counterclockwise rotation direction.

When the first arm 41A1 is disengaged from the latch groove 44A of the rotation plate 44, and the rotation plate 44 rotates in the counterclockwise direction based on the tensile force of the spring 47, a stopper can be provided at the base 43 side and a projection can be provided at the rotation plate 44 side. With this arrangement, the stopper can stop the projection, thereby obtaining the state shown in FIG. 10B.

Figure 11A:
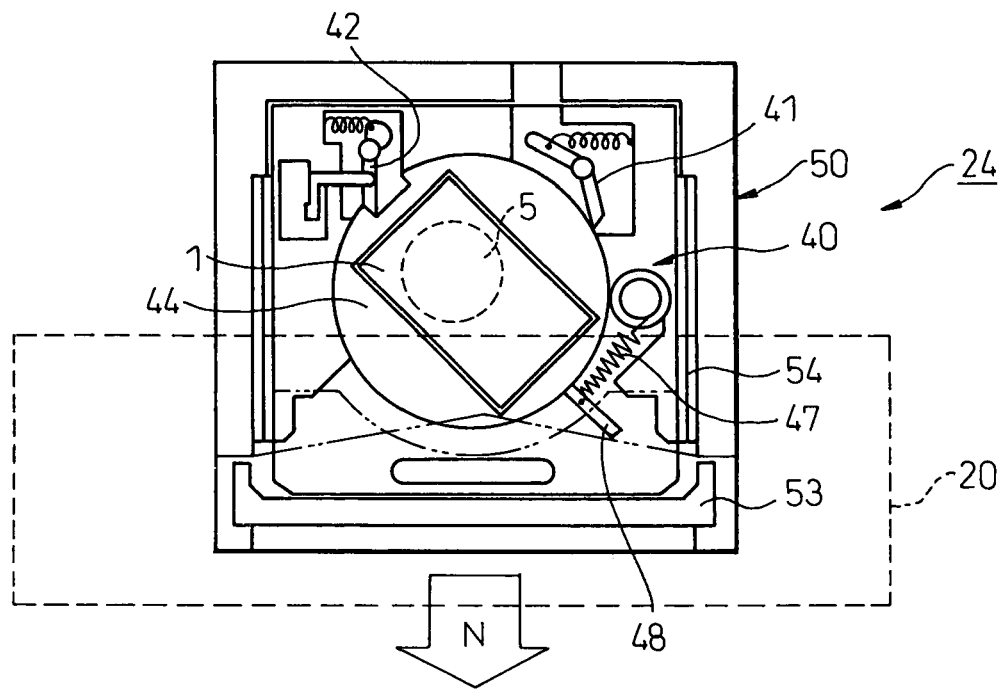
FIG. 11A is a top plan view showing a state that the tray shown in FIG. 10B moves within the data erasing device toward the initial position within the data erasing device according to the fourth embodiment.

After the tray 24 reaches the state shown in FIG. 10B, the tray 24 moves in the direction of an arrow head N within the data erasing device 30, and returns to the initial position, as shown in FIG. 11A. The tray 24 passes through between the demagnetizing circuits 20A and 20B while the tray 24 returns toward the initial position. Consequently, the data recorded on the magnetic disk 5 is erased by the demagnetizing circuit 20. In this case, the direction of the magnetic disk device 1 accommodated in the tray 24 is different by 90 degrees from the direction of the data erasing device 30 when the tray 24 proceeds toward the back of the data erasing device 30. With this arrangement, a part of the data which has not been erased when the tray 24 proceeds toward the back of the data erasing device 30 can be erased.

Figure 11B:
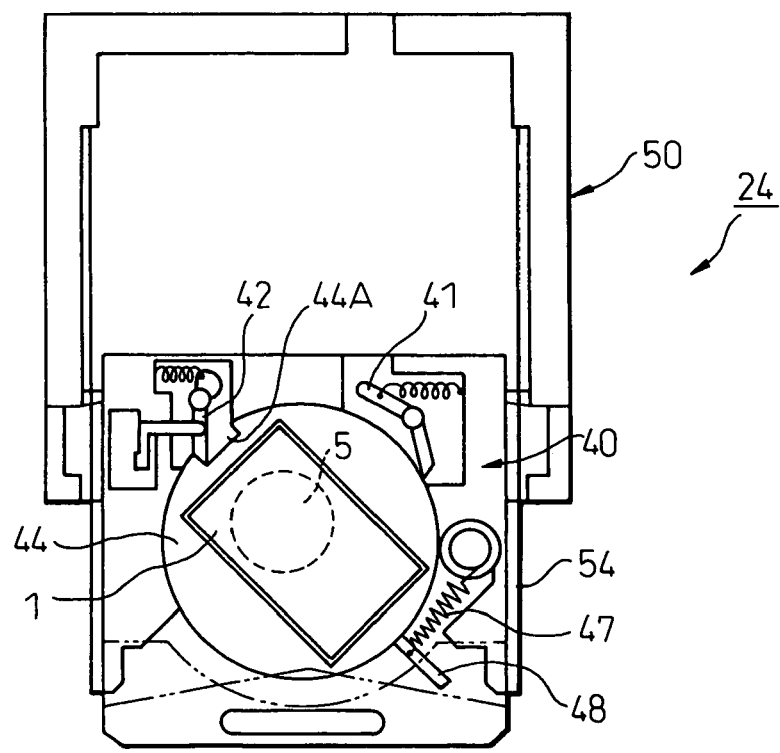
FIG. 11B is a top plan view showing a state that the tray shown in FIG. 11A stops at the initial position within the data erasing device, and the inner tray is drawn out from the outer tray according to the fourth embodiment.

After the tray 24 returns to the initial position within the data erasing device 30, the door 36 shown in FIG. 6 is opened either automatically or manually. Consequently, the inner tray 40 is drawn out from the outer tray 50 by the sliding mechanism 54, as shown in FIG. 11B. In this state, the magnetic disk device 1 from which the data is erased can be drawn out from the disk device accommodation groove 46 of the inner tray 40.

Figure 12:
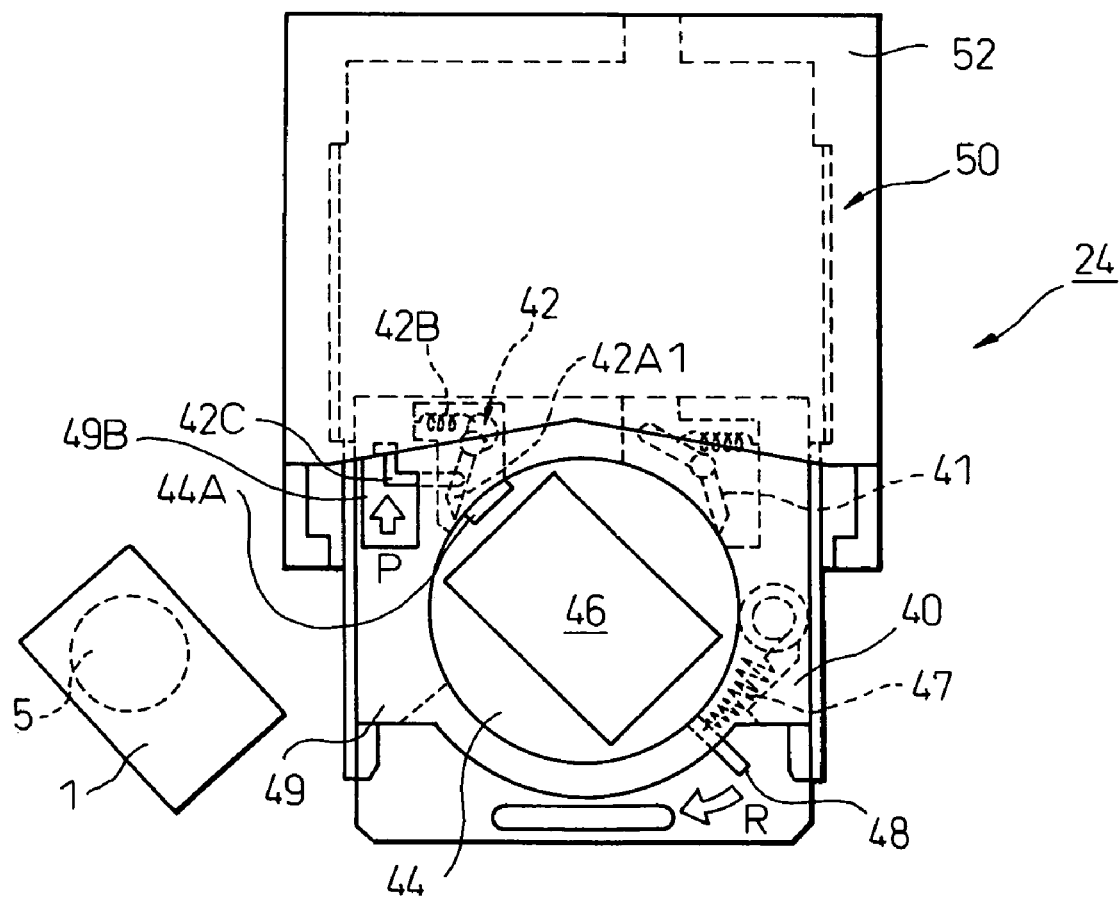
FIG. 12 is a top plan view for explaining a state that the magnetic disk device is taken out from the inner tray in the state shown in FIG. 11B, and thereafter, a rotation table within the inner tray is manually returned to the state shown in FIG. 8B.

After the magnetic disk device 1 from which the data is erased is extracted from the disk accommodation groove 46 of the inner tray 40, the operator presses, with a finger, the release lever 42C that appears in the release hole 49B formed on the inner tray 49, in the direction of an arrow head P, as shown in FIG. 12. As a result, the first arm 42A1 of the second latch lever 42 is disengaged from the latch groove 44A of the rotation plate 44. In this state, when the operator moves the lever 48 to a direction of an arrow head R, with a finger, the rotation plate 44 rotates against the tensile force of the tension spring 47. The cover 49 of the inner tray 40 and the cover 52 of the outer tray 50 are shown in FIG. 12.

When the rotation plate 44 rotates, the latch groove 44A moves, and then, the first arm 41A1 of the first latch lever 41 enters the latch groove 44A. When the operator takes off the hand from the lever 48 in the state that the first arm 41A1 enters the latch groove 44A, the rotation plate 44 is biased to rotate in the counterclockwise direction due to the tensile force of the spring 47. However, the first arm 41A1 of the first latch lever 41 that enters the latch groove 44A stops this rotation. This state is the same as the state shown in FIG. 8B. Consequently, the operator can carry out the demagnetization operation of the next magnetic disk device 1 in the state shown in FIG. 8B.

As explained above, according to the data erasing device 30 of the fourth embodiment, the rotation plate 44 can automatically switch the inner tray 40 that constitutes the tray 24 from the disk accommodation groove 32 to the disk accommodation groove 63A of the tray 22 according to the second embodiment explained with reference to FIG. 5C. The tray 24 is automatically reciprocated within the data erasing device 30. Consequently, the rotation plate 44 can automatically switch the inner tray 40 that constitutes the tray 24 from the disk accommodation groove 31 to the disk accommodation groove 63 of the tray 21 according to the first embodiment explained with reference to FIG. 5B. Similarly, the rotation plate 44 can automatically switch the inner tray 40 from the disk accommodation groove 33 to the disk accommodation groove 63 of the tray 23 according to the third embodiment explained with reference to FIG. 5D.

Further, at the time of automatically reciprocating the tray 24 within the data erasing device 30, the angle formed by the disk device accommodation groove at the initial position and the center line of the inner tray is not particularly prescribed, in a condition where an angle difference of 90 degrees between the angle formed by the magnetic disk device 1 in the forward path and the angle formed by the magnetic disk device 1 in the backward path is formed.

In the above embodiments, while the magnetic disk device (i.e., the hard disk drive) 1 is explained as the magnetic recording medium from which data is erased by the data erasing devices 30, 50, and 50A, the magnetic recording medium from which data is erased by the data erasing devices 30, 50, and 50A is not particularly limited.

What is claimed is:

1. A data erasing device that erases data, recorded on a magnetic recording device, by using a magnetic field generated from permanent magnets each having a north pole and a south pole, the data erasing device comprising:
   a main body case having an opening on at least one side surface, and having a path which is connected to the opening inside the main body, the main body case to reciprocate the magnetic recording device;
   magnetic field generating sources provided along at least one of surfaces of the path parallel with the magnetic recording device, and having plural permanent magnets adjacently disposed in mutually adsorbing polarities; and
   a tray being capable of reciprocating within the main body case on the path and having a first accommodation groove and a second accommodation groove, the first accommodation groove to accommodate the magnetic recording device at a first angle and the second accommodation groove to accommodate the magnetic recording device at a second angle which is different from the first angle.

2. The data erasing device according to claim 1, wherein
the magnetic recording device is a magnetic disk device, and
the first and the second accommodation grooves are formed on the tray such that the position of the magnetic disk device accommodated into one accommodation groove is the same as the position of the magnetic disk device accommodated into the other accommodation groove.

3. The data erasing device according to claim 1, wherein a center line of the first accommodation groove is parallel with the center line of the tray, and the center line of the second accommodation groove is inclined by 45 degrees from the center line of the tray.

4. The data erasing device according to claim 1, wherein a center line of the first accommodation groove is parallel with the center line of the tray, and the center line of the second accommodation groove is inclined by 90 degrees from the center line of the tray.

5. The data erasing device according to claim 1, wherein a center line of the first accommodation groove is inclined by 45 degrees from the center line of the tray, and the center line of the second accommodation groove is inclined by 90 degrees from the center line of the first accommodation groove.

6. A data erasing device that erases data, recorded on a magnetic recording medium, by using a magnetic field generated from permanent magnets each having a north pole and a south pole, the data erasing device comprising:
a main body case having an opening on at least one side surface, and having a path which is connected to the opening inside the main body, the main body case to the magnetic recording medium;
magnetic field generating sources provided along at least one of surfaces of the path parallel with the magnetic recording medium, and having plural permanent magnets adjacently disposed in mutually adsorbing polarities; and
a tray to accommodate the magnetic recording medium, and capable of reciprocating within the main body case on the path, wherein
the tray is provided with a rotation plate having an accommodation for accommodating the magnetic recording medium, and is provided with a rotation mechanism of the rotation plate, and
the rotation mechanism to rotate the rotation plate by a predetermined angle when the tray returns from the innermost position toward the opening on the path, from the position of the tray when the tray proceeds toward the innermost position on the path.

7. The data erasing device according to claim 6, wherein
the tray includes an inner tray that has a rotation plate having the accommodation groove, and an outer tray that accommodates the inner tray,
the outer tray to reciprocate within the path, and
when the outer tray is at an initial position within the path, the inner tray is drawn out from the outer tray, and the rotation plate is positioned at the outside of the data erasing device.

8. The data erasing device according to claim 7, wherein
the inner tray comprises:
an energizing mechanism to rotate the rotation plate in the counterclockwise direction;
a first latch mechanism to latch the rotation of the rotation plate, and stops the rotation plate at a first position;
a second latch mechanism to latch the rotation plate at a second position when the rotation plate latched by the first latch mechanism is delatched, and is rotated in the counterclockwise direction;
a releasing mechanism to release a latch state of the second latch mechanism; and
a lever to enable the rotation plate to be manually rotated to return to the first position when the releasing mechanism releases a latch state.

9. The data erasing device according to claim 8, wherein
a release projection to release the rotation plate latched by the first latch mechanism is provided at the end of the path, and
when the outer tray reaches the end of the path, the projection is brought into contact with the first latch mechanism, thereby releasing the rotation plate latched by the first latch mechanism.

10. The data erasing device according to claim 6, wherein the rotation mechanism to rotate the rotation plate by 90 degrees.

11. The data erasing device according to claim 6, wherein the rotation mechanism to rotate the rotation plate by 45 degrees.

* * * * *